United States Patent
Lee et al.

(10) Patent No.: US 11,953,084 B2
(45) Date of Patent: Apr. 9, 2024

(54) STRUCTURE FOR PROTECTING DRIVE DEVICE

(71) Applicant: Nissan Motor Co., Ltd., Yokohama (JP)

(72) Inventors: Jaehak Lee, Kanagawa (JP); Yuta Katsushima, Kanagawa (JP); Kenji Arai, Kanagawa (JP); Daisuke Asakura, Kanagawa (JP); Harunobu Abe, Kanagawa (JP); Kohei Yamada, Kanagawa (JP); Norihisa Tsujimura, Kanagawa (JP); Yasuaki Nakamura, Kanagawa (JP); Toshimitsu Kakizaki, Kanagawa (JP); Kazuhiro Maguchi, Kanagawa (JP); Kentarou Kurata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 326 days.

(21) Appl. No.: 17/630,752

(22) PCT Filed: Jun. 9, 2020

(86) PCT No.: PCT/JP2020/022698
§ 371 (c)(1),
(2) Date: Jan. 27, 2022

(87) PCT Pub. No.: WO2021/250779
PCT Pub. Date: Dec. 16, 2021

(65) Prior Publication Data
US 2022/0260149 A1 Aug. 18, 2022

(51) Int. Cl.
*B62D 25/20* (2006.01)
*B60R 13/08* (2006.01)
(Continued)

(52) U.S. Cl.
CPC .......... *F16H 57/031* (2013.01); *B62D 25/20* (2013.01); *B60R 13/0861* (2013.01); *B62D 21/155* (2013.01); *B62D 35/02* (2013.01)

(58) Field of Classification Search
CPC ... F16H 57/031; B60K 2001/001; B60K 1/02; B62D 21/155; B62D 25/20;
(Continued)

(56) References Cited

U.S. PATENT DOCUMENTS 8,657,350 B2 * 2/2014 Cabo ................... B60R 19/00
180/69.1
8,839,901 B1 * 9/2014 Bradshaw .......... B62D 25/2072
180/346
(Continued)

FOREIGN PATENT DOCUMENTS

JP     61-205843 U    12/1986
JP     2001-30963 A    2/2001
(Continued)

*Primary Examiner* — Gregory A Blankenship
(74) *Attorney, Agent, or Firm* — Global IP Counselors, LLP (57) ABSTRACT

A drive device protection structure has a rotary electric machine, a gearbox connected the rotary electric machine, an undercover disposed underneath the drive device and a protecting plate provided to the undercover. The rotary electric machine has a rotary electric machine housing that has a rotary electric machine flange. The gearbox has a gearbox housing that has a gearbox flange. The rotary electric machine flange and the gearbox flange are connected together. The rotary electric machine flange and the gearbox flange are formed such that a lower surface of the gearbox flange is positioned lower than a lower surface of the rotary electric machine flange. The protecting plate is formed of a material more rigid than a material of the undercover. The protecting plate is provided beneath connecting part between
(Continued)

the rotary electric machine flange and the gearbox flange so as to face the connecting part.

6 Claims, 6 Drawing Sheets

(51) Int. Cl.
*B62D 21/15* (2006.01)
*B62D 35/02* (2006.01)
*F16H 57/031* (2012.01)

(58) Field of Classification Search
CPC .... B62D 25/2072; B62D 35/02; B60R 19/56; B60R 2021/002; B60R 13/0838; B60R 13/0869; B60R 13/0861
See application file for complete search history.

(56) References Cited

U.S. PATENT DOCUMENTS

| | | | | |
|---|---|---|---|---|
| 2010/0200313 | A1* | 8/2010 | Takeshita | B60R 13/0861 180/65.1 |
| 2013/0181476 | A1* | 7/2013 | Naoi | B62D 35/02 296/180.1 |
| 2013/0220718 | A1* | 8/2013 | Gotou | B60K 1/00 180/65.6 |
| 2014/0329125 | A1* | 11/2014 | Miyanaga | B60R 13/0861 429/100 |
| 2015/0119181 | A1* | 4/2015 | Fox | F16H 48/22 475/230 |
| 2015/0329153 | A1* | 11/2015 | Oohashi | B62D 35/02 296/180.1 |
| 2016/0207386 | A1* | 7/2016 | Nagaosa | B60K 1/04 |
| 2016/0304132 | A1* | 10/2016 | Ideshio | B60K 17/00 |
| 2018/0100576 | A1* | 4/2018 | Nishikawa | B60K 5/12 |
| 2018/0215328 | A1* | 8/2018 | Sweder | B60R 13/0861 |
| 2018/0273115 | A1* | 9/2018 | Ito | B60R 13/0838 |
| 2019/0009835 | A1* | 1/2019 | D'Amico | F16B 5/02 |
| 2019/0126983 | A1* | 5/2019 | Okura | B60K 1/04 |
| 2019/0176720 | A1* | 6/2019 | Shirotori | B60R 13/0861 |
| 2019/0283561 | A1* | 9/2019 | Battaglia | B62D 7/18 |
| 2019/0291785 | A1* | 9/2019 | Nagano | B62D 21/155 |
| 2019/0344650 | A1* | 11/2019 | Suumen | B60K 1/00 |
| 2019/0351946 | A1* | 11/2019 | Eklund | B21C 23/142 |
| 2020/0186002 | A1* | 6/2020 | Fröhlich | G10K 11/162 |
| 2020/0198708 | A1* | 6/2020 | Endoh | B60R 13/0861 |
| 2020/0223488 | A1* | 7/2020 | Chikazawa | B60K 5/1216 |
| 2020/0307699 | A1* | 10/2020 | Takahashi | B62D 21/155 |
| 2020/0331532 | A1* | 10/2020 | Volz | B60K 1/04 |
| 2022/0032859 | A1* | 2/2022 | Ambo | B60R 13/0861 |
| 2022/0081037 | A1* | 3/2022 | Jeong | B60K 1/04 |
| 2022/0260149 | A1* | 8/2022 | Lee | B62D 25/2072 |
| 2022/0306207 | A1* | 9/2022 | Katayama | H01M 50/249 |
| 2023/0063716 | A1* | 3/2023 | Seon | B62D 21/09 |
| 2023/0191886 | A1* | 6/2023 | Nabuchi | B60R 13/0861 180/65.1 |
| 2023/0278506 | A1* | 9/2023 | Nihei | B60R 13/08 296/193.07 |
| 2023/0406415 | A1* | 12/2023 | Erber | B60K 1/04 |

FOREIGN PATENT DOCUMENTS

| | | |
|---|---|---|
| JP | 2010-000859 A | 1/2010 |
| JP | 2018-62205 A | 4/2018 |
| JP | 2018-158602 A | 10/2018 |

* cited by examiner

STRUCTURE FOR PROTECTING DRIVE DEVICE

CROSS-REFERENCE TO RELATED APPLICATIONS

This application is a U.S. national stage application of International Application No. PCT/JP2020/022698, filed on Jun. 9, 2020.

BACKGROUND

Technical Field

The present invention relates to a structure for protecting a drive device.

Background Information

Electric automobiles or hybrid vehicles in which an engine, a gearbox, and a drive motor are connected in series are known in the art. JP 2010-000859 A discloses a drive device for a hybrid vehicle in which a gear is accommodated between an engine and a motor (rotary electric machine).

SUMMARY

A drive device such as that of the prior art is provided in an engine compartment, and a bottom of the drive device faces a road surface with an undercover, etc., interposed therebetween. In a drive device configured as such, shock or another major external force is sometimes delivered from a road-surface side. When major external force is delivered from below to a connecting part of a flange that links the gearbox and the rotary electric machine, the bolts, etc., securing a connecting part of a housing will sometimes loosen. As a result, there is a possibility that rotation axes of the gearbox and the rotary electric machine will be misaligned, causing a problem in motive power transmission.

The present invention was contrived in view of such problems, it being an object of the invention to provide a structure for protecting a drive device in which even when major external force has been delivered from below to a connecting part of a flange that links a gearbox and a rotary electric machine, loosening of linking can be minimized.

One embodiment of the present invention is applied to a structure for protecting a drive device, the structure configured from a drive device provided with a rotary electric machine and a gearbox, and an undercover disposed underneath the drive device. The rotary electric machine and the gearbox are connected together by a rotary electric machine flange of a rotary electric machine housing and a gearbox flange of a gearbox housing. The rotary electric machine flange and the gearbox flange are formed such that a lower surface of the gearbox flange is positioned lower than a lower surface of the rotary electric machine flange. The undercover is provided with a protecting plate formed of a material more rigid than a material of the undercover. The protecting plate is provided on an underside a connecting part the rotary electric machine flange and the gearbox flange, and is provided facing the connecting part.

According to the present invention, because the protecting plate is provided on the underside of the part linking the rotary electric machine flange and the gearbox flange, when external force is delivered from below, the protecting plate comes into contact with the gearbox flange first, and a direction of a load delivered to the gearbox flange and a direction of a load delivered to the rotary electric machine flange can be changed. Loosening of the part linking the rotary electric machine flange and the gearbox flange is thereby minimized.

BRIEF DESCRIPTION OF THE DRAWINGS

Referring now to the attached drawings which form a part of this original disclosure.

DETAILED DESCRIPTION OF EMBODIMENTS

A structure for protecting a drive device 1 of an embodiment of the present invention is described below with reference to the drawings, etc.

Figure 1:
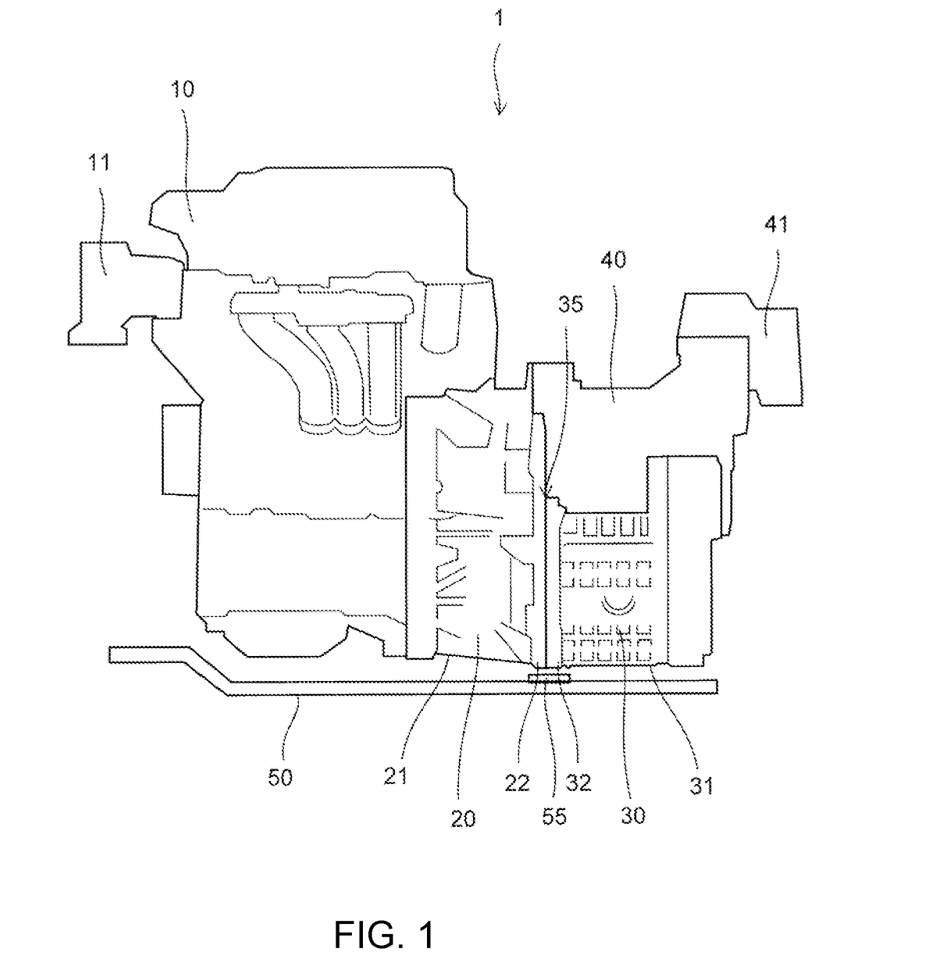
FIG. 1 is a front view of a drive device for a vehicle of an embodiment of the present invention.

FIG. 1 is a front view of the drive device 1 for a vehicle of the present embodiment. In the present embodiment, the front face represents what is faced when the drive device is observed from the front in a vehicle longitudinal direction. The drive device 1 comprises an engine 10, a gearbox 20, an electric power generator 30 serving as a rotary electric machine, and a drive motor 40. An undercover 50 is provided on an underside of the drive device 1.

The engine 10 causes the electric power generator 30 to generate electric power by rotatably driving the electric power generator 30. The electric power generated by the electric power generator 30 is accumulated in a battery (not shown).

The drive motor 40 is a source of driving force for the vehicle and is driven by being supplied with the electric power of the battery.

The gearbox 20 is a transmission device having a plurality of gears. The gearbox 20 allows the electric power generator 30 to generate electric power by transmitting rotation delivered from the engine 10 to the electric power generator 30. In addition, the gearbox 20 drives the vehicle by transmitting rotation delivered from the drive motor 40 to drive wheels (not shown).

The drive motor 40 also functions as an electric power generator that performs electric power generation (regeneration) by receiving driving force provided by rotation of the drive wheels. The drive device 1 of the present embodiment may be used as a drive device for devices other than vehicles, e.g., various electric instruments or industrial machines.

In the drive device 1, the electric power generator 30 is disposed in front of the drive motor 40 and slightly lower than the drive motor 40.

An engine mount 11 is provided on an upper left part of the engine 10, and a motor mount 41 is provided on an upper right part of the drive motor 40. The drive device 1 is configured such that the engine 10, the gearbox 20, the electric power generator 30, and the drive motor 40 are integrated as a unit, and the drive device 1 is secured to the vehicle via the engine mount 11 and the motor mount 41. The engine mount 11 and the motor mount 41 are provided with pads made of rubber, etc., and vibration and shock transmitted between the vehicle and the drive device 1 are therefore damped.

The undercover 50 is provided underneath the drive device 1. The undercover 50 is formed of a resin or another material so as to cover lower surfaces of the drive device 1 and other various components disposed in the lower part of the vehicle. The undercover 50 includes a protecting plate 55 (described hereinafter) and functions as a protecting member that protects the drive device 1.

A structure lining the electric power generator 30 and the gearbox 20 shall next be described.

The gearbox 20 has a gearbox housing 21 in which a gear mechanism composed of a plurality of gears is accommodated. The interior of the gearbox housing 21 has a hollow tubular shape. Flange parts for linking to the engine 10, the electric power generator 30, and the drive motor 40 by bolt-fastening are formed protruding on a periphery of both end sides of the gearbox housing 21. In the present embodiment, the flange part facing the electric power generator 30, i.e., flange part on the right side of FIG. 1 is referred to particularly as a gearbox flange 22.

The electric power generator 30 has a cylindrical electric power generator housing 31 that accommodates rotary electric machine components including a rotor, a stator, etc. An electric power generator flange 32 is formed protruding on a periphery of a left end side (gearbox side) of the electric power generator housing 31.

The electric power generator 30 is connected to the gearbox 20 by using bolts to fasten the gearbox flange 22 of the gearbox 20 and the electric power generator flange 32 in a state of having been brought into contact with each other. The electric power generator 30 has a "cantilever" structure which does not include a mount that is secured to the vehicle, and in which only one side (the left side in FIG. 1) along the rotation axis direction is supported by the gearbox 20.

Figure 2:
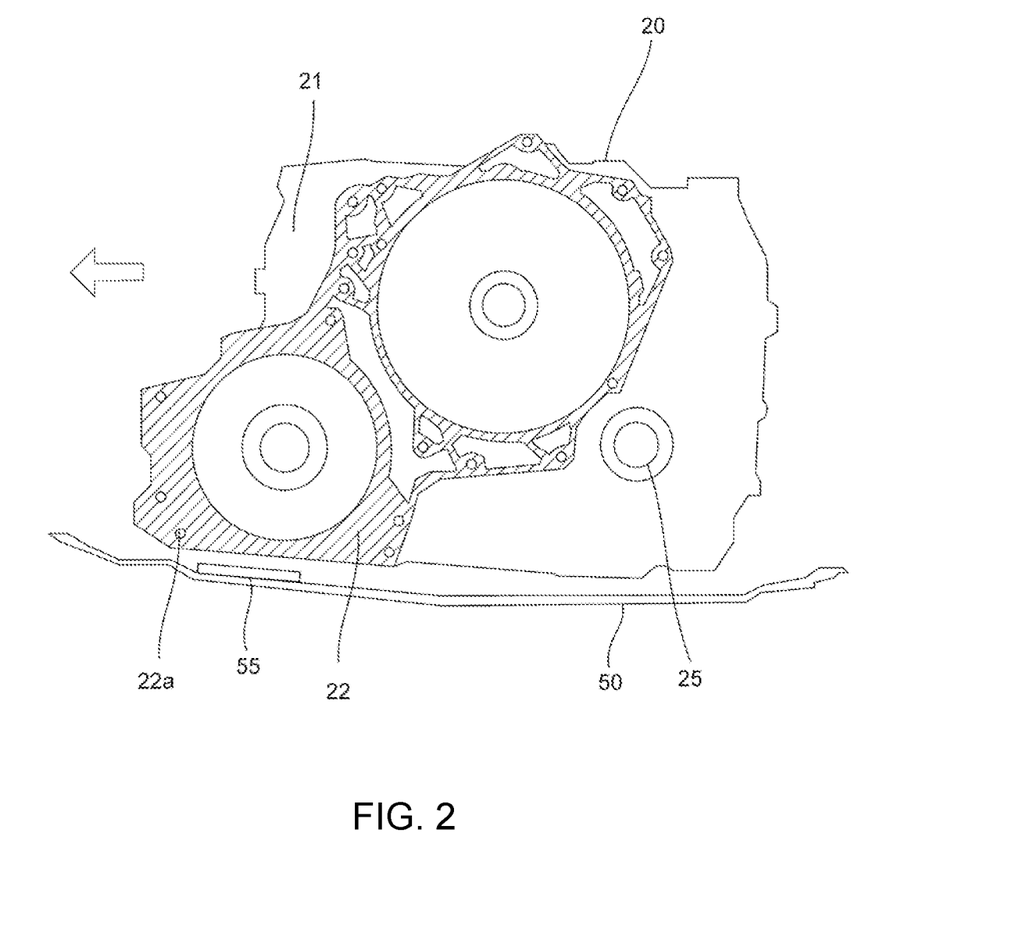
FIG. 2 is a side view illustrating a gearbox housing and a gearbox flange of the drive device.

FIG. 2 is an explanatory drawing of a flange surface of the gearbox flange 22 of the gearbox 20, as seen along the direction of the rotation axis of the gearbox 20 (the width direction of the vehicle).

The flange surface of the gearbox flange 22 (shown in hatching) has a plurality of bolt taps 22a for securing the electric power generator 30, as shown in FIG. 2. The electric power generator flange 32 of the electric power generator 30 similarly has bolt holes, and the electric power generator 30 is secured to the gearbox 20 by inserting and fastening bolts in these bolt holes. The drive motor 40 and the gearbox 20 are similarly secured, as are the engine 10 and the gearbox 20.

The gearbox 20 includes an axle hole 25 through which an axle is inserted, as shown in FIG. 2. An axle (not shown) is connected to a final gear of the gearbox 20 in the axle hole 25.

In the drive device 1 thus configured, the gearbox 20 and the electric power generator 30 are connected by the gearbox flange 22 and the electric power generator flange 32 as previously described. A case shall be considered in which external force from the underside of the vehicle is delivered to the drive device 1. The term "external force" means, for example, a load when a collision occurs between the drive device 1 and an obstacle such as a curb on the road surface.

The undercover 50 is present on the underside of the drive device 1, and the undercover 50 is made of a resin and protects the drive device 1 against minor external force caused by shock from gravel, etc., during traveling, and easily deforms when subjected to a major external force. Therefore, when a major external force is delivered, the external force would be directly delivered underneath the drive device 1.

When a major external force is delivered to the drive device, the load caused by the external force is damped by the pads of the engine mount 11 and the motor mount 41.

However, problems such as the following occur when the load is delivered locally to a lower surface of a connecting part 35 of the gearbox flange 22 and the electric power generator flange 32.

The electric power generator 30 has a cantilever structure as previously described and does not include a mount that serves to dampen loads. Therefore, a load delivered to the lower surface of the connecting part 35 of the gearbox flange 22 and the electric power generator flange 32 acts without being damped and acts as force in a shearing direction between the gearbox flange 22 and the electric power generator flange 32. This sometimes results in loosening or twisting of the bolts securing the gearbox flange 22 and the electric power generator flange 32.

When the bolts have loosened or twisted, the position of the electric power generator 30 with respect to the gearbox 20 sometimes becomes misaligned. A center between the rotation axes of the gearbox 20 and the electric power generator 30 may thereby be misaligned, and a problem may occur with motive power transmission.

In view of this, the present embodiment is configured as follows so that no misalignment occurs between the gearbox 20 and the electric power generator 30 even if major external force is delivered.

Figure 3:
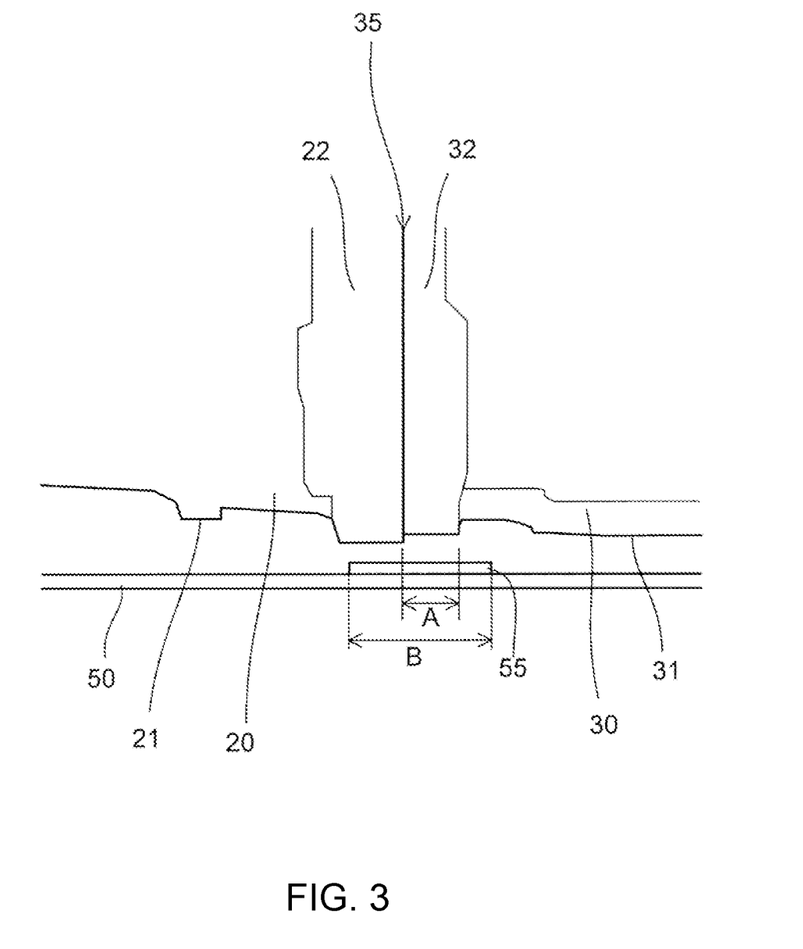
FIG. 3 is an explanatory drawing of a protecting plate.

FIG. 3 is an enlarged view of the vicinity of the connecting part of the gearbox 20 and the electric power generator 30 of the present embodiment, and is an explanatory drawing of the protecting plate 55.

In the connecting part 35 of the gearbox 20 and the electric power generator 30, the flange surface of the gearbox flange 22 and a flange surface of the electric power generator flange 32 are in contact with each other. In such a structure linking the gearbox 20 and the electric power generator 30, a bottom part (lower surface) of the gearbox flange 22 is formed so as to be positioned slightly lower than a bottom part (lower surface) of the electric power generator flange 32. Specifically, the bottom part of the gearbox flange 22 and the bottom part of the electric power generator flange 32 are not flush with each other, but are configured so that the positions thereof in the height direction are different.

The undercover 50 is a cover member that covers a lower surface of the drive device 1, and the protecting plate 55 is provided in a position of facing the connecting part 35 of the gearbox 20 and the electric power generator 30. The protecting plate 55 is disposed in a position near the front of the vehicle (see FIG. 2). The protecting plate 55 is formed of a material (e.g., steel, stainless steel, or another metal) more rigid than the undercover 50. The protecting plate 55 is bolted, welded, riveted, or otherwise secured to an upper surface of the undercover 50 facing the drive device 1.

The protecting plate 55 is provided so as to face both the lower surface of the gearbox flange 22 and the lower surface of the electric power generator flange 32, as shown in FIG. 3. The protecting plate 55 is disposed facing the electric power generator flange 32 in the direction in which the gearbox flange 22 and the electric power generator flange 32 are connected, and a length of the protecting plate 55 (indicated by letter B in FIG. 3) is greater than a length (thickness) of the electric power generator flange 32 (indicated by letter A in FIG. 3).

By thus providing the protecting plate 55 to the undercover 50, it is possible to minimize the direct delivery of a load to the connecting part 35 of the gearbox flange 22 and the electric power generator flange 32, and particularly to the electric power generator flange 32, due to major external force.

Figure 4:
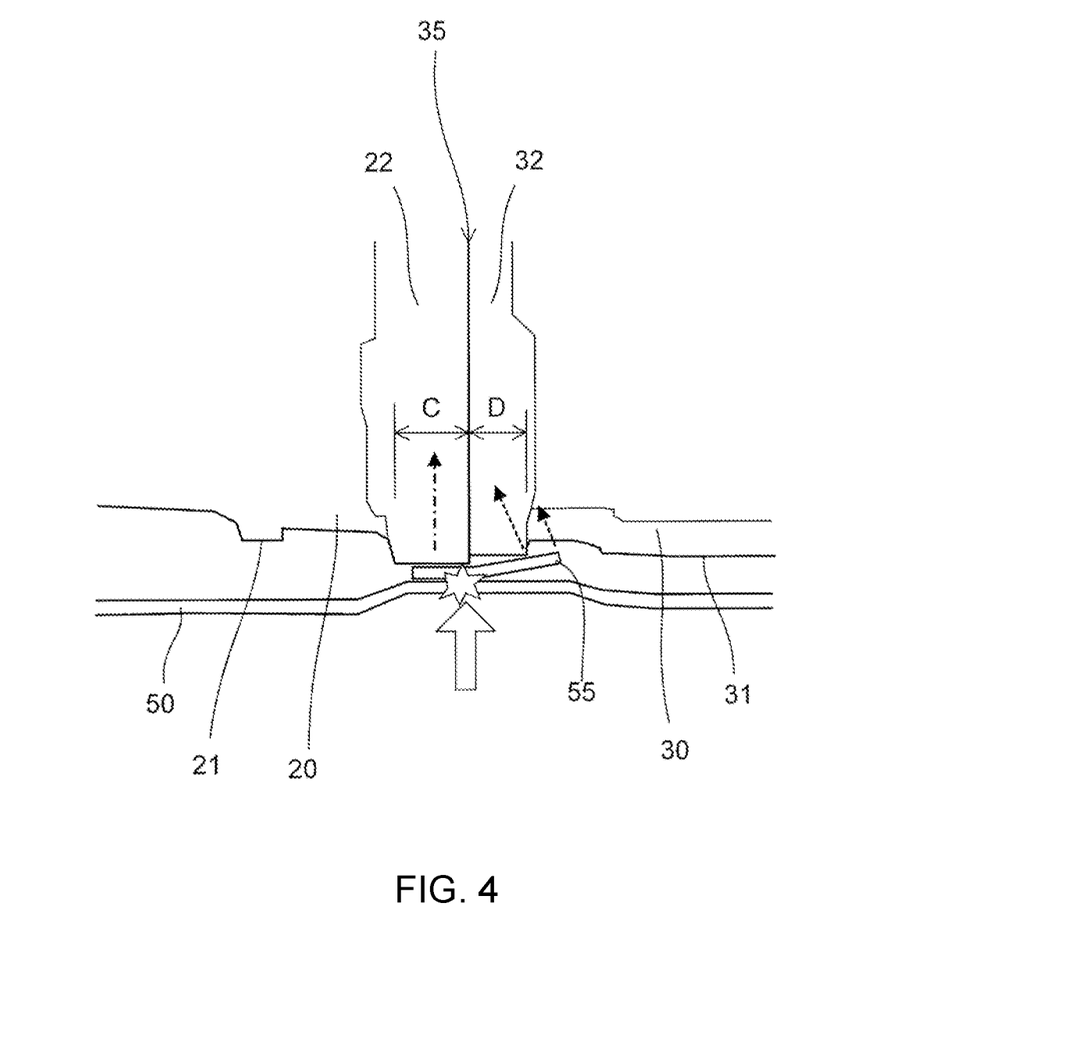
FIG. 4 is an explanatory drawing of the protecting plate when a load is delivered.

FIG. 4 is an explanatory drawing of behavior of the protecting plate 55 when major external force is delivered to the connecting part 35 of the gearbox flange 22 and the electric power generator flange 32.

As shown in FIG. 4, when a load from a major external force is delivered to the connecting part 35 of the gearbox flange 22 and the electric power generator flange 32, the external force is first delivered to the protecting plate 55 of the undercover 50. The undercover 50 thereby deforms and the protecting plate 55 interferes with corners of the gearbox flange 22 and the electric power generator flange 32.

At this time, because the lower surface of the gearbox flange 22 is positioned lower than the lower surface of the electric power generator flange 32, the protecting plate 55 first comes into contact with the gearbox flange 22. Due to the load from the external force, a right-side portion (the portion facing the electric power generator 30) of the protecting plate 55 deforms so as to bend with the corner of the gearbox flange 22 as a fulcrum, as shown in FIG. 4.

The right-side portion of the deformed protecting plate 55 collides with the corner of the electric power generator flange 32 or with the electric power generator housing 31 to the right of the electric power generator flange 32.

Due to this configuration, when major external force is delivered, the protecting plate 55 changes the direction of the load acting on the gearbox flange 22 (indicated by the single-dot-dash lined arrow in FIG. 4) and the direction of the load acting on the electric power generator flange 32 (indicated by the dotted line arrow in FIG. 4). Thus, due to the direction of the load delivered to the gearbox flange 22 and the direction of the load delivered to the electric power generator flange 32 being changed in the connecting part 35, the exertion of force in the shearing direction on the connecting part 35 of the gearbox flange 22 and the electric power generator flange 32 is minimized.

In the direction in which the electric power generator flange 32 and the gearbox flange 22 are connected, the length (thickness) of the electric power generator flange 32 (indicated by letter D in FIG. 4) may be formed less than a length (thickness) of the gearbox flange 22 (indicated by letter C in FIG. 4). Due to such a configuration, the protecting plate 55 comes into contact with the gearbox flange 22 first and does not readily come directly into contact with the electric power generator flange 32 even when the protecting plate 55 deforms due to a load. The exertion of force in the shearing direction on the connecting part 35 of the gearbox flange 22 and the electric power generator flange 32 is thereby minimized.

As described above, the structure for protecting the drive device 1 of the present embodiment is configured from the drive device 1 including the electric power generator (rotary electric machine) 30 and the gearbox 20, and the undercover 50 disposed underneath the drive device 1. The electric power generator 30 and the gearbox 20 are connected to each other by the electric power generator flange 32 of the electric power generator housing 31 and the gearbox flange 22 of the gearbox housing 21. The electric power generator flange 32 and the gearbox flange 22 are formed such that the lower surface of the gearbox flange 22 is positioned lower than the lower surface of the electric power generator flange 32. The undercover 50 includes the protecting plate 55, which is formed of a material more rigid than a material of the undercover 50. The protecting plate 55 is provided on the underside of the connecting part 35 of the electric power generator flange 32 and the gearbox flange 22, and is provided facing the connecting part 35.

In the present embodiment, due to such a configuration, when major external force is delivered from underneath the drive device 1, the protecting plate 55 comes into contact first with the lower surface of the gearbox flange 22 disposed lower than the lower surface of the electric power generator flange 32. It is thereby possible to change the direction of the load delivered to the gearbox flange 22 and the direction of the load delivered to the electric power generator flange 32 in the connecting part 35. Accordingly, the direct exertion of a load in the shearing direction between the gearbox flange 22 and the electric power generator flange 32 can be minimized; therefore, any incidence of loosening and twisting of the bolts secured to the electric power generator flange 32 and the gearbox flange 22 is minimized, and any incidence of problems in the transmission of motive power between the gearbox 20 and the electric power generator 30 can be minimized.

The protecting plate 55 is disposed facing the electric power generator flange 32 and is formed longer than the length of the electric power generator flange 32 in the direction in which the electric power generator flange 32 and the gearbox flange 22 are connected. Due to such a configuration, external force from underneath causes the protecting plate 55 to come into contact first with a location other than the electric power generator flange 32. As a result, in the connecting part 35, the direction of the load delivered to the gearbox flange 22 and the direction of the load delivered to the electric power generator flange 32 can be reliably changed, and it is therefore possible to minimize the direct exertion of a load in the shearing direction between the gearbox flange 22 and the electric power generator flange 32.

A modification of the embodiment of the present invention shall next be described.

Figure 5:
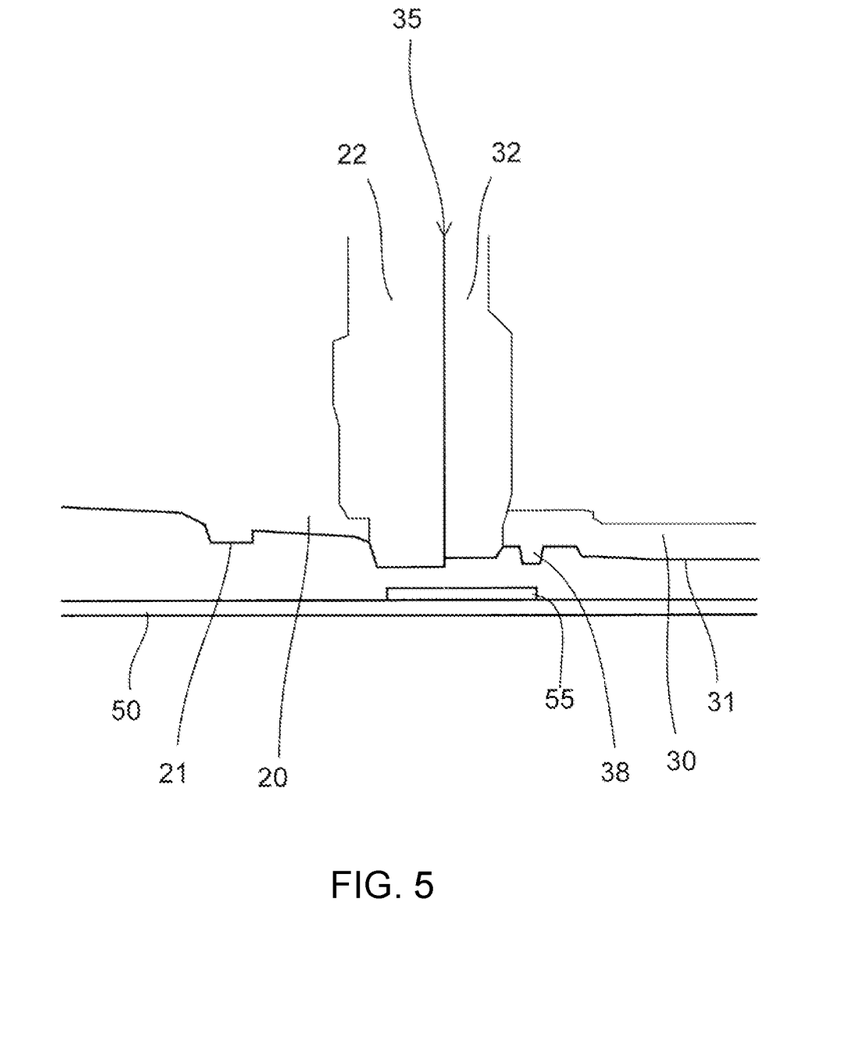
FIG. 5 is an explanatory drawing of a protecting plate of a modification.

FIG. 5 is an explanatory drawing of the protecting plate 55 of a modification of the present embodiment, and FIG. 5 corresponds to FIG. 3.

In the modification shown in FIG. 5, a protruding part 38 extending toward the protecting plate 55 is formed in the electric power generator housing 31 in a different position from the electric power generator flange 32. The protruding part 38 is configured as a protrusion extending downward from a lower surface of the electric power generator housing 31, and is disposed in a position of facing the protecting plate 55.

A lower-end surface of the protruding part 38 is disposed extending farther downward than the lower surface of the electric power generator flange 32, and is positioned at the same height or slightly higher than a lower-end surface of the gearbox flange 22.

Specifically, in this modification of the present embodiment, the electric power generator housing 31 includes a protruding part 38 extending downward from the lower surface of the electric power generator housing 31 in a different position from the electric power generator flange 32, where the protruding part faces the protecting plate 55.

Due to such a configuration, when major external force is delivered, the protecting plate 55 comes into contact first with both the gearbox flange 22 and the protruding part 38, and a load is not directly delivered to the electric power generator flange 32. As a result, in the connecting part 35, the direction of the load delivered to the gearbox flange 22 and the direction of the load delivered to the electric power generator flange 32 are changed, whereby the exertion of force in the shearing direction on the connecting part 35 of the gearbox flange 22 and the electric power generator flange 32 is minimized.

Figure 6:
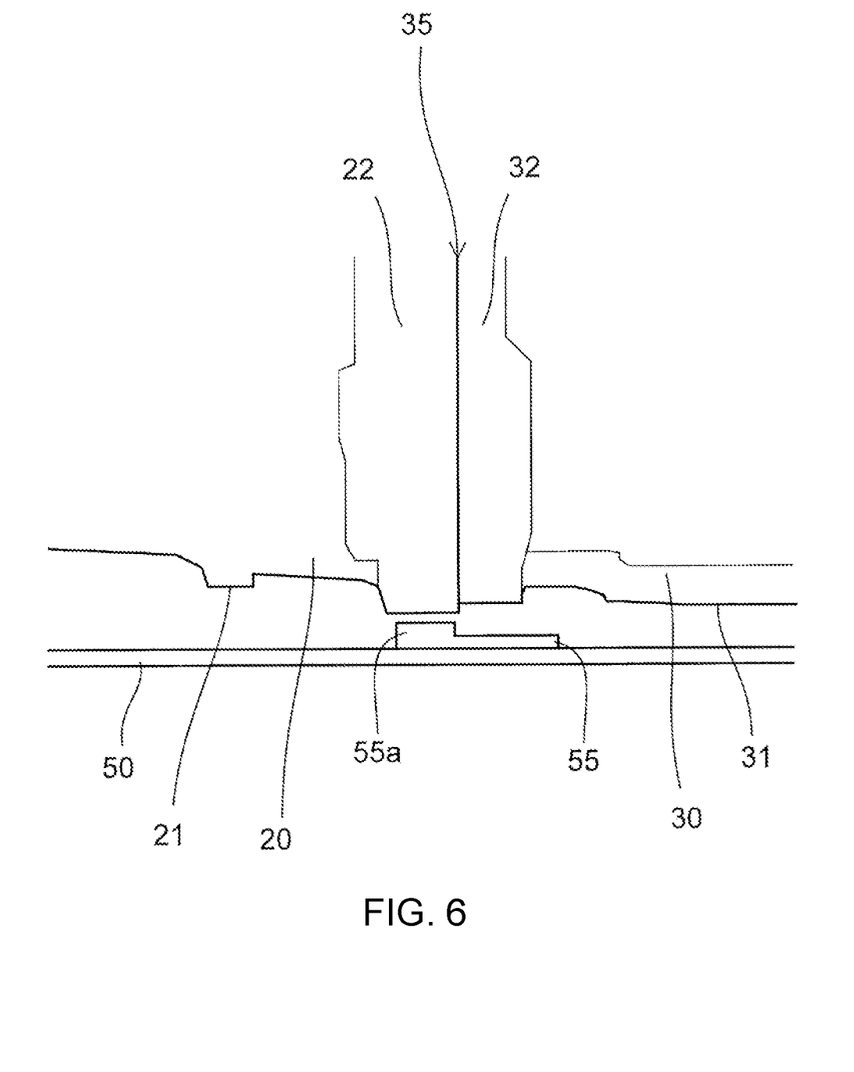
FIG. 6 is an explanatory drawing of a protecting plate of another modification.

FIG. 6 is an explanatory drawing of the protecting plate 55 of another modification of the present embodiment, and FIG. 6 corresponds to FIG. 3.

In another modification shown in FIG. 6, the protecting plate 55 has a close part 55a, where a location facing the gearbox flange 22 is closer than a location facing the electric power generator flange 32. The close part 55a is formed with greater thickness in a direction of plate pressure. Specifically, in the other modification of the present embodiment, the protecting plate 55, when observed from the front face, includes a close part 55a in which a plate thickness of the location facing the gearbox flange 22 is formed greater than a plate thickness of the location facing the electric power generator flange 32. In other words, a distance from the close part 55a of the protecting plate 55 to the gearbox flange 22 is less than a distance from the close part 55a to the electric power generator flange 32.

In the other modification of the present embodiment configured in this manner, when major external force is delivered, the close part 55a of the protecting plate 55 comes into contact first with the gearbox flange 22, and the rest of the protecting plate 55 deforms in the same manner as shown in FIG. 4 to collide with the corner of the electric power generator flange 32 and/or the electric power generator housing 31. As a result, in the connecting part 35, the direction of the load delivered to the gearbox flange 22 and the direction of the load delivered to the electric power generator flange 32 are changed, whereby the exertion of force in the shearing direction on the connecting part 35 of the gearbox flange 22 and the electric power generator flange 32 is minimized.

The embodiment and modifications of the present invention merely depict some applied examples of the present invention, and are not intended to limit the technical scope of the present invention to the specific configuration in the embodiment described above.

In the previously-described present embodiment, the protecting plate 55 was disposed underneath and vehicle-forward of the electric power generator 30, but the protecting plate 55 may also be disposed underneath and vehicle-rearward of the electric power generator 30. Furthermore, when bottom surfaces of the gearbox flange 22 and the electric power generator flange 32 are not uniform in height (are inclined) along the vehicle longitudinal direction, the protecting plate 55 may be disposed at the position of the lowest surface. When the protecting plate 55 is disposed vehicle-forward of the electric power generator, the protecting plate mainly protects against loads delivered when the vehicle is traveling forward. When the protecting plate 55 is disposed vehicle-rearward of the electric power generator, the protecting plate mainly protects against loads delivered when the vehicle is traveling in reverse. Moreover, the protecting plate 55 may be disposed fully across the longitudinal direction of the electric power generator 30. necting part.

The invention claimed is:

1. A drive device protection structure comprising:
a drive device including a rotary electric machine and a gearbox;
an undercover disposed underneath the drive device; and
a protecting plate provided to the undercover,
the rotary electric machine and the gearbox being connected together by a rotary electric machine flange of a rotary electric machine housing and a gearbox flange of a gearbox housing,
the rotary electric machine flange and the gearbox flange being formed such that a lower surface of the gearbox flange is positioned lower than a lower surface of the rotary electric machine flange,
the protecting plate being formed of a material more rigid than a material of the undercover, and
the protecting plate being provided on an underside of a connecting part between the rotary electric machine flange and the gearbox flange so as to face the connecting part.

2. The drive device protection structure according to claim 1, wherein
the protecting plate is disposed facing the rotary electric machine flange, and is longer than a length of the rotary electric machine flange in a connection direction of the rotary electric machine flange and the gearbox flange.

3. The drive device protection structure according to claim 1, wherein
the length of the rotary electric machine flange is less than a length of the gearbox flange in the connection direction of the rotary electric machine flange and the gearbox flange.

4. The drive device protection structure according to claim 1, wherein
the rotary electric machine housing is provided with a protruding part extending downward from a lower surface of the rotary electric machine housing in a different position from the electric power generator flange, where the protruding part faces the protecting plate.

5. The drive device protection structure according to claim 1, wherein
the protecting plate has a first plate thickness in a location facing the gearbox flange and a second plate thickness in a location facing the rotary electric machine flange, the first plate thickness is greater than the second plate thickness.

6. The drive device protection structure device according to claim 5, wherein
a distance from the protecting plate to the gearbox flange is less than a distance from the protecting plate to the rotary electric machine flange.

* * * * *